US012583140B2

(12) United States Patent
Lee et al.

(10) Patent No.: US 12,583,140 B2
(45) Date of Patent: Mar. 24, 2026

(54) ELECTRODE CUTTING DEVICE

(71) Applicant: LG Energy Solution, Ltd., Seoul (KR)

(72) Inventors: Hyeon Jin Lee, Daejeon (KR); Sin Young Park, Daejeon (KR); Dong Hyeuk Park, Daejeon (KR); Sang Wook Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 361 days.

(21) Appl. No.: 17/914,224

(22) PCT Filed: Nov. 10, 2021

(86) PCT No.: PCT/KR2021/016325
    § 371 (c)(1),
    (2) Date: Sep. 23, 2022

(87) PCT Pub. No.: WO2022/103145
    PCT Pub. Date: May 19, 2022

(65) Prior Publication Data
    US 2023/0112473 A1      Apr. 13, 2023

(30) Foreign Application Priority Data
    Nov. 13, 2020     (KR) ........................ 10-2020-0151943

(51) Int. Cl.
    *B26D 1/09*          (2006.01)
    *B26D 5/02*          (2006.01)
    *H01M 10/04*         (2006.01)
(52) U.S. Cl.
    CPC .............. *B26D 1/095* (2013.01); *B26D 5/02* (2013.01); *H01M 10/0404* (2013.01)

(58) Field of Classification Search
    CPC .. B26D 7/0006; B26D 7/2628; B26D 7/2614; B26D 1/025; B26D 1/085; B26D 1/095;
    (Continued)

(56) References Cited

U.S. PATENT DOCUMENTS

| | | | | |
|---|---|---|---|---|
| 3,452,632 A | * | 7/1969 | Brolund ............... | B23D 35/008 |
| | | | | 100/224 |
| 3,638,523 A | * | 2/1972 | Yasuda ................ | B23D 35/008 |
| | | | | 83/563 |

(Continued)

FOREIGN PATENT DOCUMENTS

| | | |
|---|---|---|
| CN | 101402208 A | 4/2009 |
| CN | 204710946 U | 10/2015 |

(Continued)

OTHER PUBLICATIONS

Translation JPH1148187 A (Year: 2024).*
(Continued)

*Primary Examiner* — Nhat Chieu Q Do
(74) *Attorney, Agent, or Firm* — Lerner David LLP

(57) ABSTRACT

An apparatus for cutting an electrode of a battery includes: an all-in-one cutting cartridge module including an upper knife and a lower knife; and a cradle where the all-in-one cutting cartridge module is mounted. The all-in-one cutting cartridge module includes a module frame and an upper knife holding unit which fixes and supports the upper knife and is supported in a manner that is vertically slidable on the module frame, and the lower knife is coupled to a lower portion of the module frame to face the upper knife. The upper knife and the lower knife are installed at the module cartridge, it is possible to quantitatively adjust the clearance and straightness of the upper knife and the lower knife in advance.

13 Claims, 10 Drawing Sheets

(58) Field of Classification Search
 CPC .. B26D 1/065; B26D 5/02; B26D 2001/0053;
  B26D 2001/0066; H01M 10/0404; Y02E
   60/10
 USPC .......................................................... 83/597
 See application file for complete search history.

(56) References Cited

U.S. PATENT DOCUMENTS

| | | | | | |
|---|---|---|---|---|---|
| 3,722,338 | A | * | 3/1973 | Cherel | B23D 25/14 |
| | | | | | 83/636 |
| 2004/0226428 | A1 | * | 11/2004 | Whiteman | B23D 35/008 |
| | | | | | 83/687 |
| 2012/0085215 | A1 | * | 4/2012 | Chiang | B26D 7/2614 |
| | | | | | 83/687 |
| 2020/0406402 | A1 | | 12/2020 | Kim et al. | |

FOREIGN PATENT DOCUMENTS

| | | | | | |
|---|---|---|---|---|---|
| CN | 107297774 | A | | 10/2017 | |
| CN | 110355412 | A | * | 10/2019 | ......... B21B 15/0007 |
| CN | 210702558 | U | | 6/2020 | |
| CN | 211588561 | U | | 9/2020 | |
| CN | 211614999 | U | | 10/2020 | |
| DE | 4336626 | A1 | * | 5/1995 | ............. B23D 15/06 |
| DE | 202016100961 | U1 | * | 5/2017 | ............. B22D 31/00 |
| JP | H1148187 | A | * | 2/1999 | |
| JP | 2008168609 | A | | 7/2008 | |
| KR | 20060016511 | A | | 2/2006 | |
| KR | 20070048302 | A | | 5/2007 | |
| KR | 100908573 | B1 | | 7/2009 | |
| KR | 101115299 | B1 | | 3/2012 | |
| KR | 20120035478 | A | | 4/2012 | |
| KR | 20130102997 | A | | 9/2013 | |
| KR | 101479724 | B1 | | 1/2015 | |
| KR | 101485332 | B1 | | 1/2015 | |
| KR | 101547773 | B1 | | 8/2015 | |
| KR | 20150103904 | A | | 9/2015 | |
| KR | 20160049714 | A | | 5/2016 | |
| KR | 20160052063 | A | | 5/2016 | |
| KR | 20160085023 | A | | 7/2016 | |
| KR | 20170012955 | A | | 2/2017 | |
| KR | 101725643 | B1 | | 4/2017 | |
| KR | 20180023230 | A | | 3/2018 | |
| KR | 20200060864 | A | | 6/2020 | |

OTHER PUBLICATIONS

CN-110355412-A, Translation (Year: 2025).*
DE-4336626-A1, Translation (Year: 2025).*
Translation DE 202016100961 (Year: 2025).*
Search report from International Application No. PCT/KR2021/016325, mailed Feb. 24, 2022.

* cited by examiner

【FIG. 1】
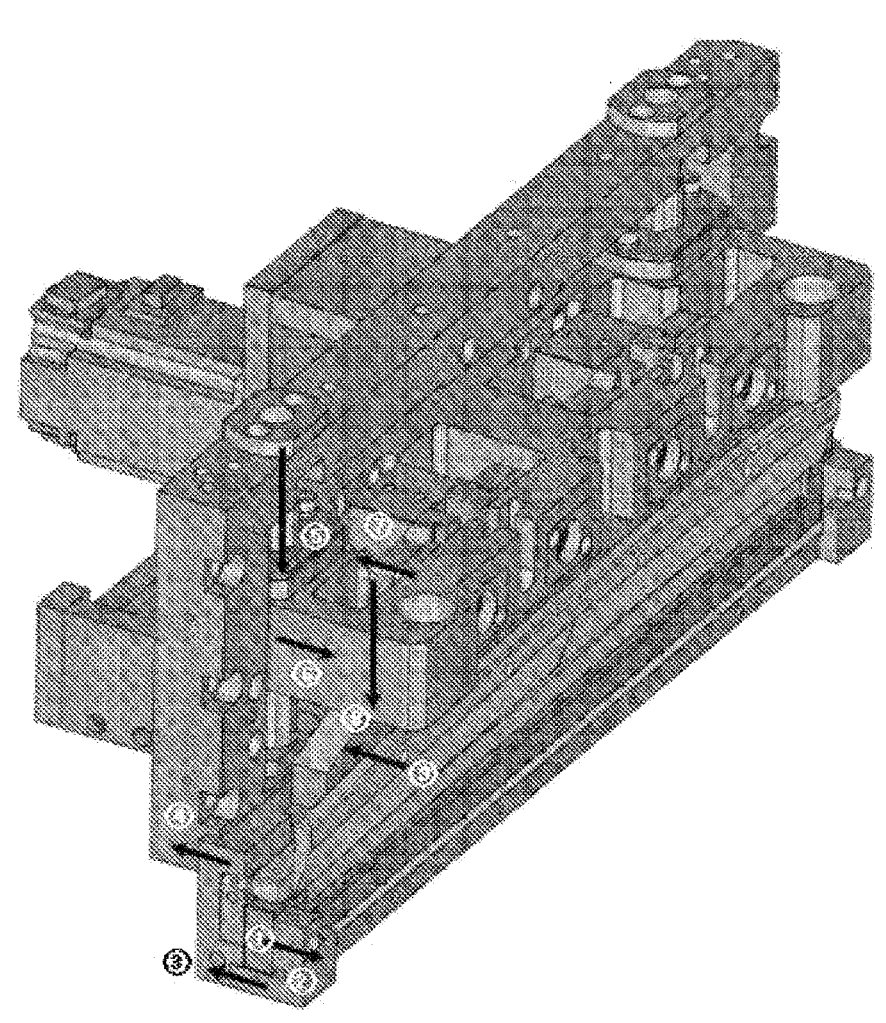

【FIG. 2】
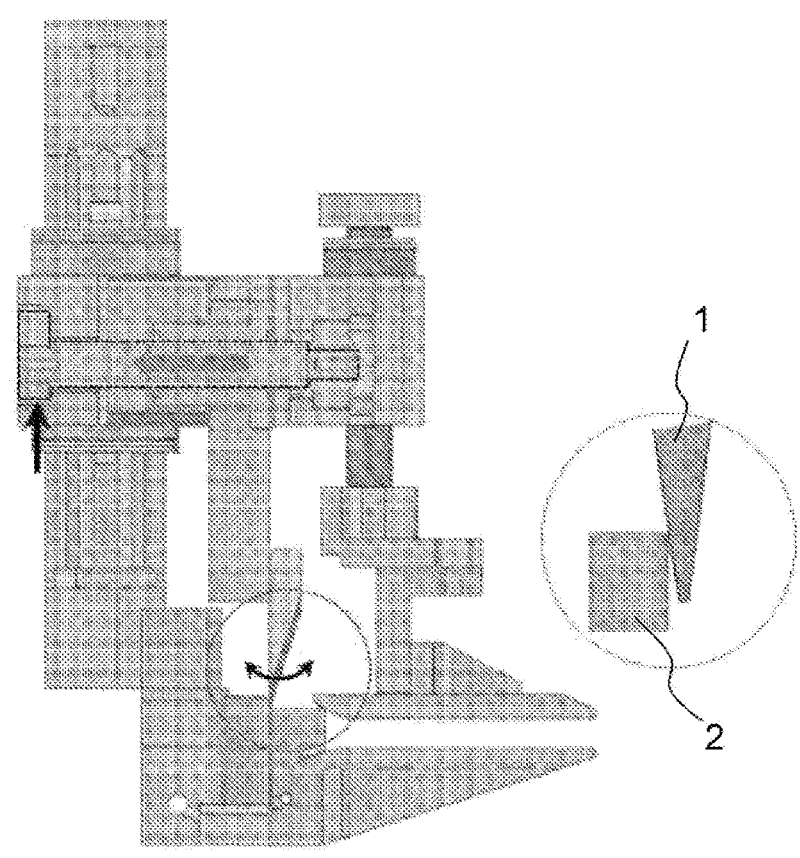

【FIG. 3】
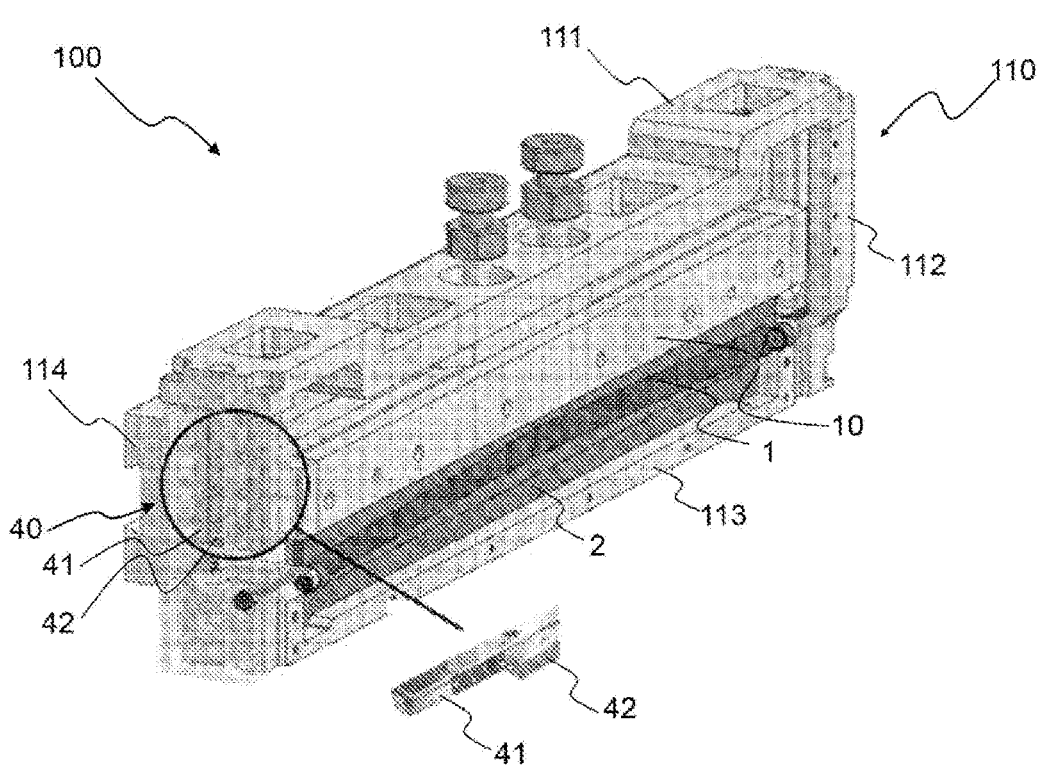

【FIG. 4】
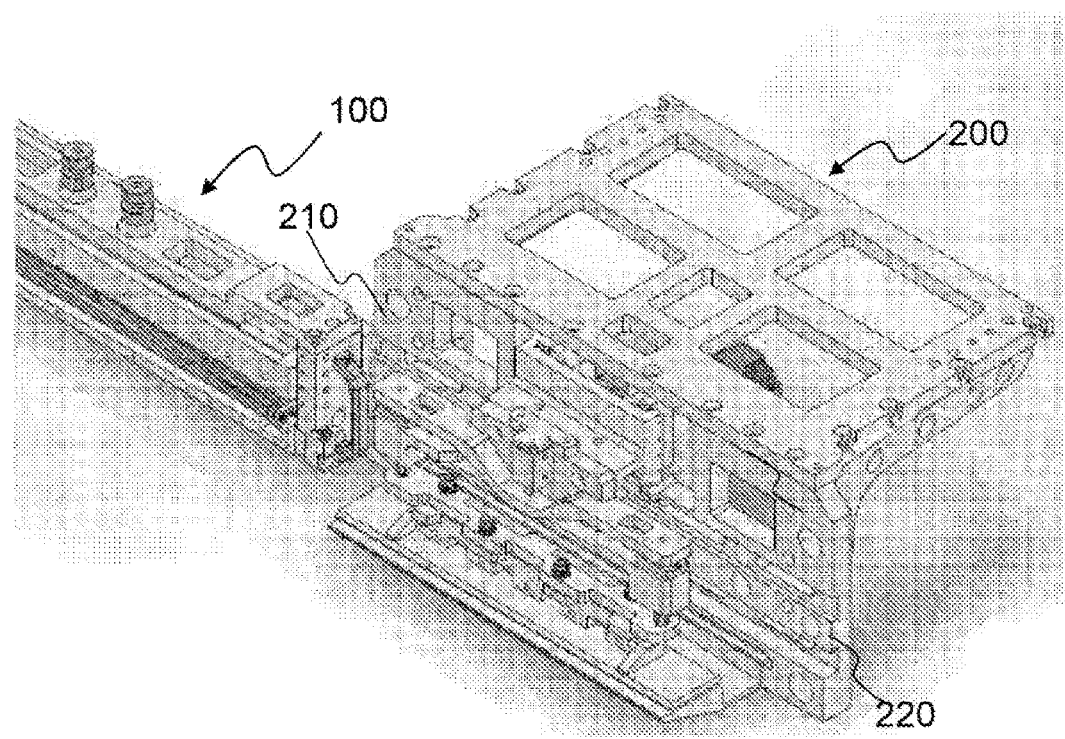

【FIG. 5】
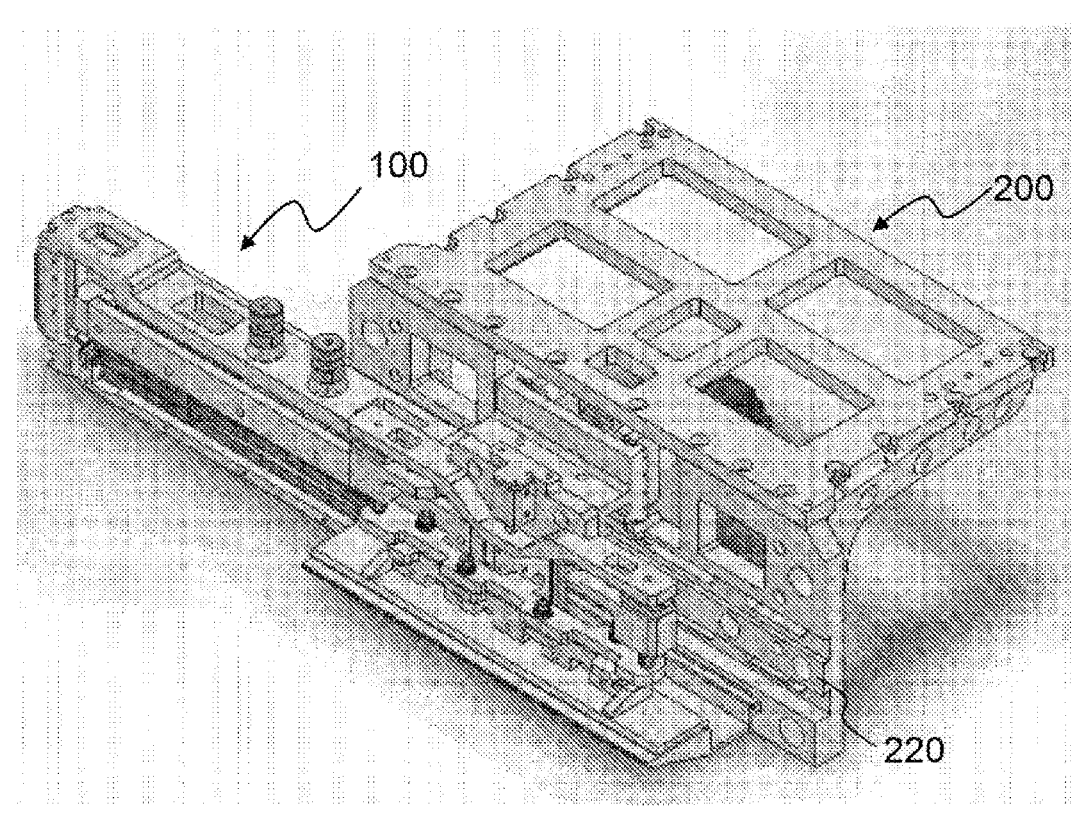

【FIG. 6】
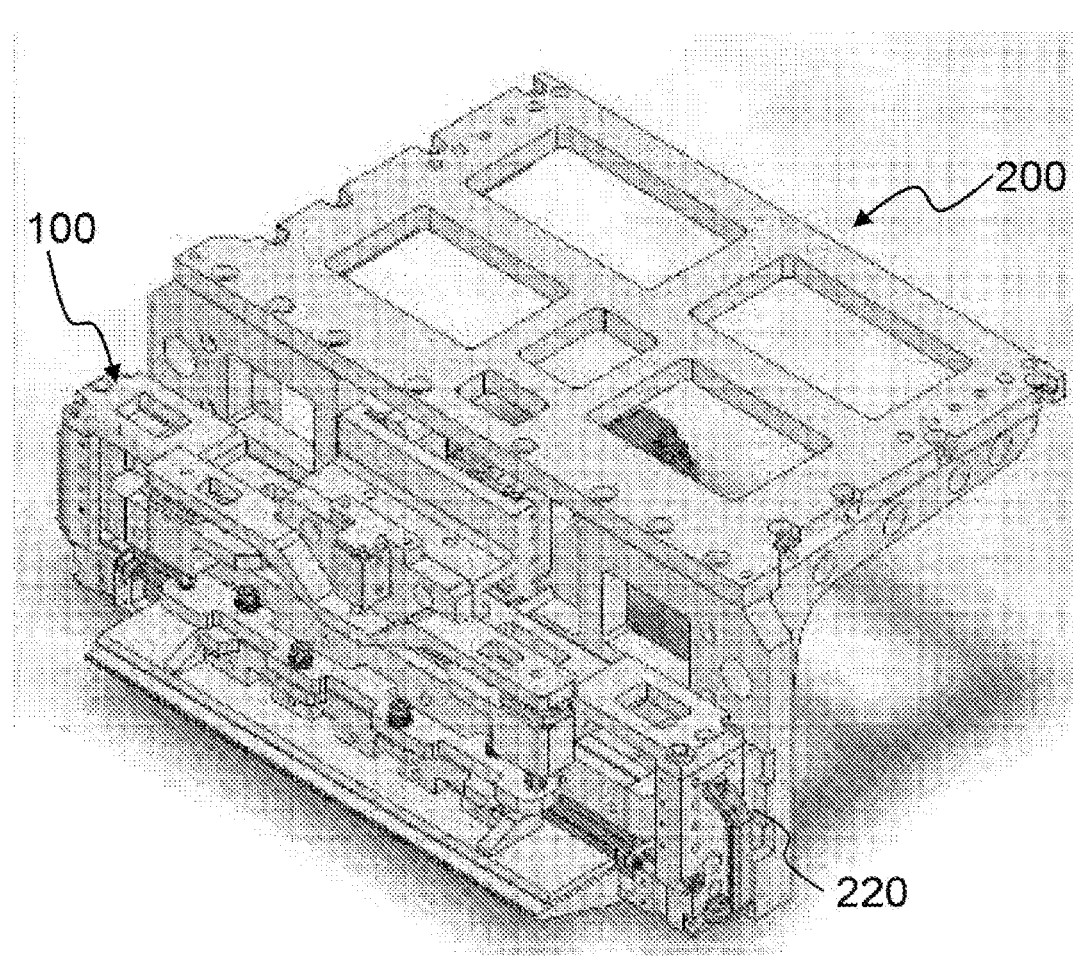

【FIG. 7】
(a)
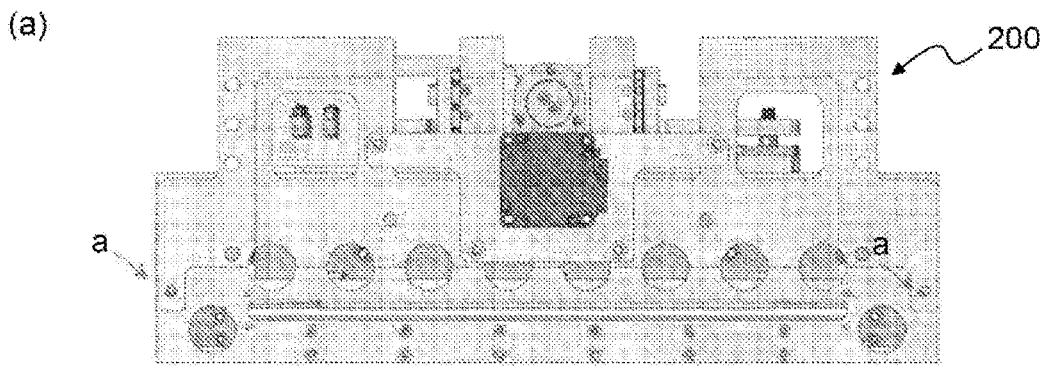
(b)
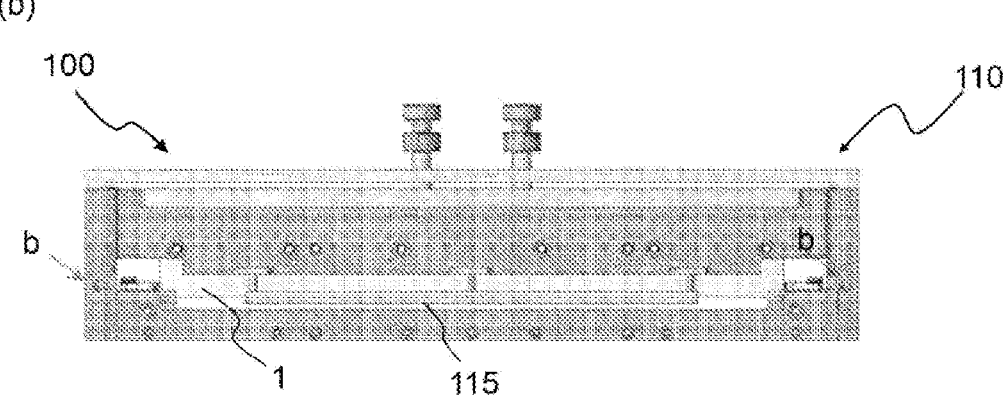

【FIG. 8】
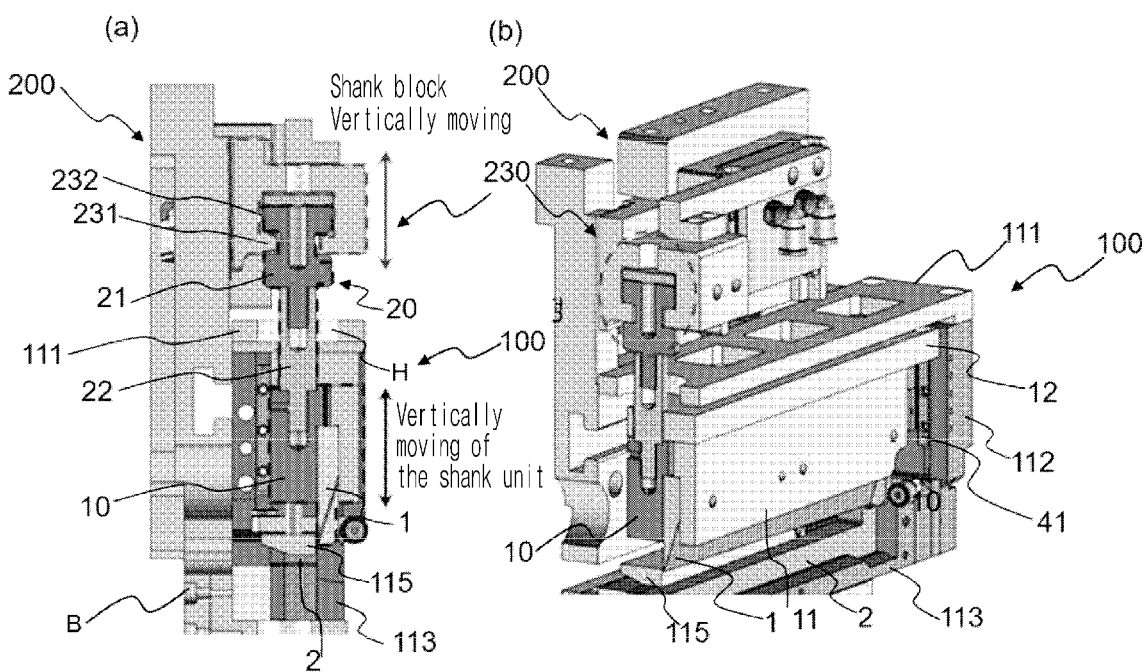

【FIG. 9】
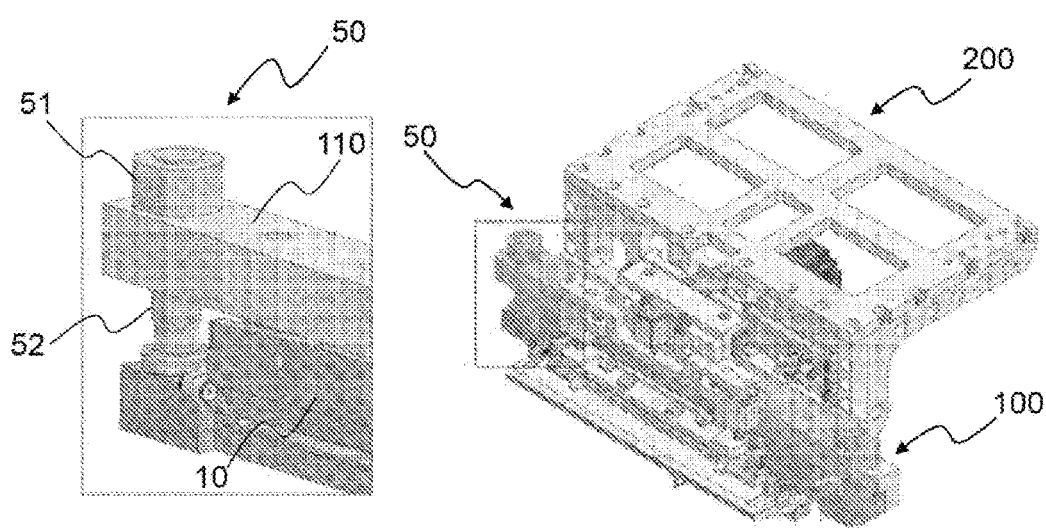

【FIG. 10】
(a)
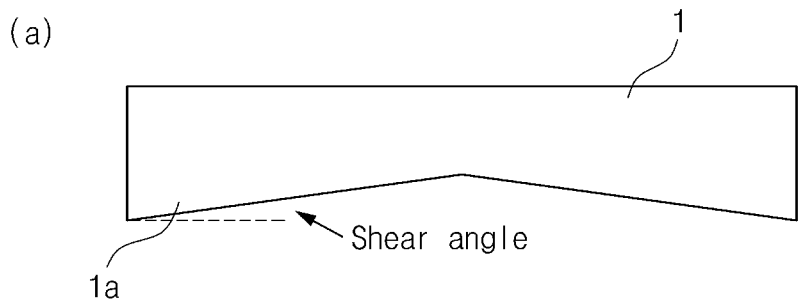
(b)
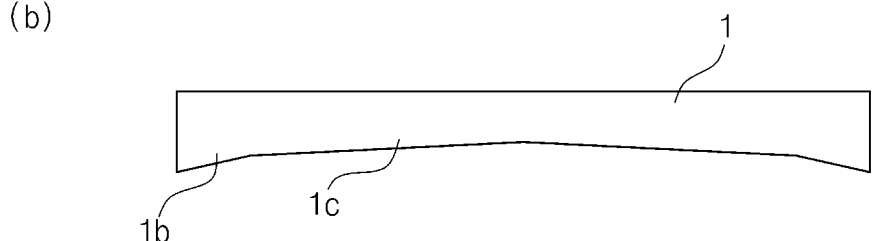

ELECTRODE CUTTING DEVICE

CROSS-REFERENCE TO RELATED APPLICATIONS

The present application is a national phase entry under 35 U.S.C. § 371 of International Application No. PCT/KR2021/016325, filed on Nov. 10, 2021, which claims priority from Korean Patent Application No. 10-2020-0151943, filed on Nov. 13, 2020, and the entire contents of the Korean patent application are incorporated herein by reference.

TECHNICAL FIELD

The present invention relates to an apparatus for cutting an electrode, and more particularly, to an apparatus for cutting an electrode by an all-in-one cutting cartridge module including both an upper knife and a lower knife.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

The electrodes used in these secondary batteries are divided into positive electrodes and negative electrodes and are used to electrically connect a battery to the outside of the battery. The electrode needs to be cut in order to obtain and use the electrode material of the positive electrode and the negative electrode in an appropriate size.

FIG. 1 is a perspective view showing a conventional electrode cutting apparatus.

As shown, the assembly of several components is required to manufacture the electrode cutting apparatus.

Specifically, at least 8 steps of assembly are required, which include a step of coupling a lower knife ① to a lower knife block ②, a step of coupling the lower knife block ② to a lower knife frame ③, a step of coupling the lower knife frame ③ to a main frame ④, a step of coupling a guide instrument ⑤ to the main frame ④, a step of coupling an upper knife block ⑥ to the main frame ④, a step of coupling a linear bush ⑦ to the upper knife block ⑥, a step of coupling an upper knife holder ⑧ to the upper knife block ⑥, and a step of coupling an upper knife ⑨ to the upper knife holder ⑧.

Likewise, in the conventional cutting apparatus, the upper knife and the lower knife are individually or independently assembled in the cutting apparatus, and accordingly, as shown in the arrow of FIG. 1, force according to the assembling order or direction was separately applied to the upper knife and the lower knife in different directions. Managing the clearance and squareness (straightness) between the upper knife and the lower knife to be within the tolerance range in the electrode cutting apparatus most significantly influences the cutting quality. However, in a structure where force is applied to the upper knife and the lower knife, respectively, as in the assembly structure of FIG. 1, it is almost impossible to adjust the clearance and squareness to be within the tolerance range.

As such, conventionally, in order to adjust the squareness between the upper knife and the lower knife, a scheme of adjusting the slope of the upper knife was sometimes adopted. FIG. 2 shows a slope regulator of the upper knife of another conventional cutting apparatus.

In FIG. 2, when the squareness between the upper knife 1 and the lower knife 2 goes beyond the tolerance range, the slope of the upper knife can be adjusted by applying force toward the left side of the upper knife 1 by adjusting the non-head bolt installed at the back surface of the block of the upper knife assembly.

However, adjusting the slope of the upper knife during the operation of the cutting apparatus decreases the productive capacity by the non-operating loss. Further, even if the side pressure is applied with a non-head bolt, it is very difficult to minutely adjust the slope of the upper knife in a preset production site, and as a cantilever type moment is generated based on the axis of the point to which the side pressure is applied, the upper knife 1 may be bent as shown in the enlarged view of FIG. 2.

This may be understood as the limitation due to the situation that upper knife 1 and the lower knife 2 are independently coupled to each separate frame and force is separately applied as shown in FIG. 1, and it is difficult to prevent bending of the blade of the upper knife, and torsion by the qualitative adjustment of the slope as in FIG. 2.

Hence, there is a need for a technology capable of quantitatively securing clearance and straightness of the upper knife and the lower knife while simply performing assembly.

DISCLOSURE

Technical Problem

The present invention is believed to solve at least some of the above problems. For example, an aspect of the present invention provides an electrode cutting apparatus capable of securing clearance and straightness of the upper knife and the lower surface while allowing a simple and easy assembly.

Technical Solution

An apparatus for cutting an electrode for solving the above problems includes: an all-in-one cutting cartridge module including an upper knife and a lower knife; and a cradle where the all-in-one cutting cartridge module is mounted.

Herein, the all-in-one cutting cartridge module includes a module frame and an upper knife holding unit which fixes and supports the upper knife and is supported in a manner that is vertically slidable on the module frame, and The lower knife is coupled to a lower portion of the module frame to face the upper knife.

In one example, the cradle includes an insertion passage, and the all-in-one cutting cartridge module is inserted into the cradle through the insertion passage.

Preferably, the cradle may include an insertion guide which guides insertion of the all-in-one cutting cartridge module.

Further, a rear surface of the all-in-one cutting cartridge module may be coupled to a surface of the cradle facing the rear surface by a coupling member.

Further, in a specific example, the cradle includes a driving unit, and the upper knife holding unit is connected to an upper portion of the cradle and is vertically moved on the module frame by the driving unit.

More specifically, a shank unit is coupled to an upper portion of the upper knife holding unit, a vertically movable shank block by the driving unit is installed on an upper portion of the cradle, and the shank unit is coupled to the shank block and the upper knife holding unit is vertically moved by movement of the shank block.

Further, in one example, the shank unit includes a shank and a shank shaft, and a passage hole, through which the shank and the shank shaft of the shank unit pass, is formed on an upper portion of the module frame.

A passage hole, through which the shank and the shank shaft of the shank unit pass, is formed on an upper portion of the module frame.

In another example, the upper knife holding unit is slidably supported on a side portion of the module frame by a cross roller guide.

Specifically, the cross roller guide includes a first guide rail installed at the module frame, and a second guide rail installed at the upper knife holding unit.

More specifically, two pairs of cross roller guides are installed between the upper knife holding unit and the module frame, a first guide rail of each pair is arranged at an external side of the module frame in a width direction, and a second guide rail of each pair is arranged at an inner side of the module frame in a width direction.

In another example, the upper knife holding unit is slidably supported on the module frame by a guide master.

In another example of the present invention, the upper knife is formed as a taper portion in which a blade of a lower end of the upper knife slants upward toward a center of the upper knife in a longitudinal direction.

Further, the taper portion is formed of multi-stage taper parts having a different tilt angle, and the tilt angle of the multi-stage taper parts gradually decreases toward the center of the upper knife in the longitudinal direction.

In another example, a stripper, which separates the electrode from the upper knife, is installed on an electrode inflow route between the upper knife and the lower knife.

Advantageous Effects

The assembly work is very simple in the electrode cutting apparatus of the present invention. Further, since the upper knife and the lower knife are installed at the module cartridge, it is possible to quantitatively adjust the clearance and straightness of the upper knife and the lower knife in advance of assembly.

Hence, it is possible to prevent generation of the non-operating loss during the operation of the apparatus and prevent detachment of the electrode.

BRIEF DESCRIPTION OF THE DRAWINGS

FIG. 1 is a perspective view showing a conventional electrode cutting apparatus.

FIG. 2 shows a slope regulator of the upper knife of a conventional cutting apparatus.

FIG. 3 is a perspective view of an all-in-one cutting cartridge module which is the main part of the electrode cutting apparatus according to an embodiment of the present invention.

FIG. 4 is a perspective view showing the state before the assembly of an electrode cutting apparatus according to one embodiment of the present invention.

FIG. 5 is a perspective view showing the state during the assembly of an electrode cutting apparatus according to one embodiment of the present invention.

FIG. 6 is a perspective view showing the state after completion of the assembly of an electrode cutting apparatus according to one embodiment of the present invention.

FIG. 7 is a rear view of a cradle and an all-in-one cutting cartridge module according to one embodiment of the present invention.

FIG. 8 shows a side view of an electrode cutting apparatus, and a perspective view where the central portion of the apparatus has been cut according to another embodiment of the present invention.

FIG. 9 is a perspective view of another embodiment of the present invention.

FIG. 10 is a schematic diagram showing a form of an upper knife applied to another embodiment of the present invention.

DETAILED DESCRIPTION OF THE PREFERRED EMBODIMENTS

Hereinafter, the detailed configuration of the present invention will be described in detail with reference to the accompanying drawings and various embodiments. Embodiments described below are exemplary to assist in understanding of the present invention, and in order to help understand the invention, the accompanying drawings are not shown as actual scale and the dimensions of some components may be exaggerated.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

An apparatus for cutting an electrode of the present invention is characterized in including an all-in-one cutting cartridge module including an upper knife and a lower knife. In the conventional technology, it was difficult to adjust the squareness because an upper knife and the lower knife are connected to separate frames or parts and receive force in different directions. However, according to the present invention, it is possible to unify force applied to the upper knife and the lower knife and adjust the squareness in advance by installing one unified module frame by modularizing the upper knife and the lower knife. The all-in-one cartridge module means that an upper knife (or a moving part including an upper knife), which cuts an electrode by vertical movements on a lower knife, is integrally mounted on one module, and means that this module has a cartridge form and can be installed on a cradle by replacement. Likewise, by configuring the upper knife and the lower knife to be included in the all-in-one cutting cartridge module, the cutting quality of the electrode may be maintained by adjusting the clearance and squareness between the upper knife and the lower knife to be within a tolerance range, thereby making the assembly of the apparatus very simple.

First Embodiment

The first embodiment of the present invention will be described with reference to FIGS. 3 to 7.

FIG. 3 is a perspective view of an all-in-one cutting cartridge module 100 which is the main part of an electrode cutting apparatus of the present invention.

The all-in-one cutting cartridge module 100 includes a single module frame 110 including an upper frame 111, a side frame 112, and a lower frame 113. The lower knife 2 is positioned at the lower portion of the module frame 110, e.g., the lower frame 113, initially to be fixed there. Further, the upper knife 1 is fixed at the upper knife holding unit 10, and the upper knife holding unit 10 is also supported by the module frame 110. Since the upper knife 1 should vertically move and cooperate with the lower knife 2 to cut the electrode, the upper knife holding unit 10 is supported by the module frame 10 in a manner that is vertically slidable. In FIG. 3, the upper knife holding unit 10 is supported by the side frame 112 by a predetermined sliding unit (to be described later). The upper knife 1 of the upper knife holding unit 10 is fine-adjusted to allow the clearance and squareness with the lower knife 2 installed at the lower frame of the module frame 110 to be within the tolerance, and is installed on the module frame 110. At this time, since the upper knife 1 (or the upper knife holding unit 10) and the lower knife 2 are installed to face one single frame (module frame 110), the direction in which the upper knife 1 and the lower knife 2 receive force is simplified, and accordingly, the adjustment of the clearance and squareness becomes easy.

Further, the assembly of the electrode cutting apparatus may be completed by mounting such an all-in-one cutting cartridge module 100 on a predetermined cradle 200.

FIGS. 4 to 6 are perspective views showing an example of the assembly process of the electrode cutting apparatus of the present invention. In this example, a structure where the all-in-one cutting cartridge module 100 may be inserted into the cradle 200 is shown.

FIG. 4 shows the state before an all-in-one cutting cartridge module 100 is inserted into a cradle 200. The cradle 200 includes an insertion passage 210 into which the cartridge module 100 may be inserted. Further, the cradle 200 includes an insertion guide 220 for guiding the insertion of the cartridge module 100. The insertion guide 220 has a form including a protrusion and a concave portion, or a slot in order to correspond to the form of the cartridge module 100. As shown in FIG. 5, if the all-in-one cutting cartridge module 100 is inserted into the insertion passage 210, the cartridge module 100 is inserted along the insertion guide of the cradle 200.

Further, the all-in-one cutting cartridge module 100 may also include a guide 114 in a form corresponding to the insertion guide 220 of the cradle 200 (see FIG. 3). Herein, the form of the insertion guide 220 and the guide 114 may be variously modified according to the apparatus design or specification of the manufactured cartridge module 110.

FIG. 6 is a perspective view showing the state of an electrode cutting apparatus of the present invention after completion of the assembly. As shown in FIG. 6, if the insertion of the cartridge module 100 is completed, the movement of the cartridge module 100 may be prevented by combining the rear surface of the cartridge module 100 with the surface of the cradle 200 facing the rear surface of the cartridge module.

FIG. 7 shows rear views of a cradle 200 and an all-in-one cutting cartridge module 100 which are elements of the present invention. 7 (a) is a rear view of the cradle 200 and FIG. 7 (b) is a rear view of the cartridge module 100.

As shown in FIG. 7, if the bolt b is fastened to the insertion position of the corresponding cartridge module 100 by inserting a bolt at the insertion position a of the rear surface of the cradle, the cartridge module 100 may be fixed to the cradle 200.

After the cartridge module 100 is fixed at the cradle 200, the electrode can be cut by vertically sliding the upper knife holding unit 10 on the module frame 110 of the cartridge module 100. In this case, the all-in-one cutting cartridge module 100 can perform cutting work by including an independent driving unit which drives the upper knife holding unit 10. However, when considering the output, size and installation space, etc. of the driving unit, an example in which the cradle 200 includes a driving unit (or the cradle 200 is connected to a driving unit) is preferred as shown in FIG. 8 and described later.

Second Embodiment

FIG. 8 shows a side view (FIG. 8(a)) of an electrode cutting apparatus according to a second embodiment of the present invention, and a perspective view (FIG. 8(b)) where the central portion of the apparatus has been cut.

The electrode cutting apparatus of the second embodiment has a structure where the upper knife holding unit 10 of the all-in-one cutting cartridge module 100 is connected to the upper portion of the cradle 200, and the upper knife holding unit 10 may be vertically moved on the module frame 110 by the driving unit (not shown) provided in the cradle 200. Specifically, a shank unit 20 and a shank block 230 are provided for connection of the upper knife holding unit 10 and the cradle 200.

The shank block 230, which may be vertically moved by the driving unit, is installed on the upper portion of the cradle 200. For example, the vertical movement of the shank block 230 becomes possible as the rotary motion of the motor, which is the driving unit, is converted into straight line motion of the shank block 230 by a predetermined mechanical link instrument. What is generally known in the art such as ball screw equipment and cam equipment may be used as such a motion conversion mechanism, so specific explanations are omitted.

The shank block 230 has a protrusion 231, which protrudes to the inner side of the block at the lower portion of the block according to the shape of the shank 21 of the shank unit 20, which is described later. The shank block 230 further has an insertion groove 232 at the upper end of the protrusion 231.

A shank unit 20 is fixed on the upper portion of the upper knife holding unit 10. The shank unit 20 includes a shank 21 coupled to a shank block 230, and a shank shaft 22 having one end coupled to the shank 21 and the other end coupled to the upper knife holding unit 10. The shank 21 and the shank shaft 22 may be formed as separate parts or integrally. The shank 21 of the example illustrated in the present drawing has a concave portion at the side portion of the cylindrical body, and the protrusion 231 of the shank block 230 is inserted into the concave portion. The upper portion of the cylindrical shank block 21 may be inserted into the insertion groove 232 of the lower portion of the shank block 230. As such, when the shank 21 is inserted into the shank block 230, the shank 20 is vertically moved by the vertical movement of the shank block 230, and the upper knife holding unit 10, which is fixed at the shank unit 20, is vertically moved (see the arrow of FIG. 8).

A passage hole H, through which the shank 21 and the shank shaft 22 of the shank unit 20 pass, is formed on an upper frame 111 of the module frame 110 of the cartridge module 100. Hence, the shank unit 20 may be vertically moved through the passage hole H freely without interference by the module frame 110.

The coupling of the shank unit 20 and the shank block 230 may be simultaneously performed with the insertion of the cutting cartridge module 100 into the cradle 200. As shown in FIGS. 4 to 6, when the cartridge module 100 is inserted into the cradle 200, the shank 21 may be inserted into the shank block 230.

The shank block 230 may be configured to allow protrusions 231 at the lower end to be approachable to each other. Namely, for example, if the shank block 230 includes two right and left separate parts, and the protrusions 231 at the lower end are made to become close to each other by fastening bolts, etc., the shank 21 may be fastened and supported.

If the shank block 230 is connected to the shank unit 20 to transmit the force of the driving unit to the shank unit 20, a substantial assembly of the electrode cutting apparatus of the present embodiment is completed. Namely, as in the second embodiment, in the structure where the upper knife holding unit 10 is driven by the driving unit of the cradle 200, the assembly of the electrode cutting apparatus of the present invention can be completed by the insertion of the all-in-one cutting cartridge module 100 into the cradle 200, the coupling between the rear surface of the all-in-one cutting cartridge module 100 and the cradle 200, and the coupling between the shank block 230 and the shank unit 20.

The operation of the electrode cutting apparatus of the second embodiment will be described with reference to FIG. 8. First, if the shank block 230 is raised by the driving unit, the shank unit 20 and the holding unit 10 connected to the shank block 230 are moved upwards. Thereafter, the electrode is moved to a space (slit) between the upper knife 1 and the lower knife 2, and the driving unit lowers the shank block 230 by the command of the controller at the point of time when the cutting of the electrode is necessary. As such, the shank 20 and the upper knife holding unit 10 of the all-in-one cartridge module 100 descend, and the upper knife 1 meets and is supported at the lower knife 2 and cuts the electrode. If the cutting of the electrode is completed, the shank block 230 is moved upwards by the driving unit, and accordingly, the shank unit 230 and the upper knife holding unit 10 are moved upwards to thereby finish the cutting job. As described above, both the upper knife holding unit 10 and the lower knife 2 are supported by the module frame 110 of the all-in-one cutting cartridge module 100, and accordingly, the clearance and straightness between the upper knife and the lower knife are appropriately maintained.

Third Embodiment

The third embodiment of the present invention will be described with reference to FIG. 3.

The vertical movement of the upper knife holding unit 10 is slidably supported by the module frame 110. A known LM guide may also be considered for the sliding support. However, in the present embodiment, a cross roller guide 40 is provided to smoothly guide the slide of the upper knife holding unit 10, etc. The cross roller guide 40 is a guide which includes two guide rails having a V-shaped roller receiving groove, and a plurality of cylindrical rollers. A plurality of rollers, which are close to each other, may have rotation shafts which intersect and cross at right angles. Two guide rails may surface-contact the rolling surface of a plurality of rollers. The detailed configuration of the cross roller guide is known, so further explanation is omitted.

In the present invention, as illustrated in FIG. 3, the first guide rail 41 of the cross roller guide 40 was installed on the module frame (side frame) of the cartridge module 100, and the second guide rail 42 was installed on the upper knife holding unit 10. As the upper knife holding unit 10 is vertically moved, the second guide rail 42 may perform slide-guiding while smoothly contacting the first guide rail 41. In order to more stably perform slide-guiding, two pairs of cross roller guides 40 are provided between the upper knife holding unit 10 and the module frame 110 in the present invention. FIG. 3 illustrates a perspective view where two pairs of guides partly cut the apparatus. Referring to FIG. 3, a first guide rail 41 is installed at the external side in the width direction of the module frame (side frame 112) among each pair of cross roller guides 40, and the second guide rail 42 is installed at the inner side in the width direction of the module frame among each pair of cross roller guides 40. A stable guiding of the upper knife holding unit 10 becomes possible by dispersing the load in the width direction of the module frame 110 by two pairs of cross roller guides 40.

Fourth Embodiment

FIG. 9 is a perspective view of a fourth embodiment of the present invention.

FIG. 9 shows a case where a guide master 50, which is not a cross roller guide, is employed as a sliding support structure of the upper knife holding unit 10. Namely, in the fourth embodiment, a guide master 50, which can prevent rotation in the circumference direction of the guide axis at the time of performing guiding, is employed.

The guide master includes a needle roller, a retainer which maintains the needle roller, a sleeve having the retainer therein, and a post which slides into the sleeve. Since the guide master includes a needle roller and a polygon retainer, the rotation in the circumference direction of the post can be prevented even when the post is moved in the sleeve.

FIG. 9 shows that the sleeve 51 is connected to the module frame 110, and the upper knife holding unit 10 is coupled to a post (not shown) installed at a unit 52 having the post therein, to thereby be sliding-guided vertically.

Fifth Embodiment

FIG. 10 is a schematic diagram showing a different form of an upper knife according to another embodiment of the present invention.

In FIGS. 3 to 8, an upper knife 10 in a form shown in FIG. 10(a) is used. In this form, the width of the central side surface of the blade of the lower end of the upper knife is large, and the width of the blade gradually decreases toward the center in the longitudinal direction. Namely, the upper knife is formed as a taper portion 1a in which a blade of a lower end of the upper knife slants upward toward a center of the upper knife in a longitudinal direction.

Such a form is used to increase the shear angle of the portion which contacts the electrode for the first time at the time of cutting the electrode. If the shear angle is set to be large, the pressure may be easily dispersed to two sides, thereby preventing the electrode from being torn or damaged. However, in the form of FIG. 10(a), the depth of the central portion of the upper knife is great, and accordingly, the upper knife 1 should be deeply pressed to completely cut the electrode. Namely, it is a problem that the stroke of the upper knife holding unit 10 increases.

In order to prevent this, the present inventor proposed a multi-stage angle type upper knife 1 of FIG. 10(b). In the example of FIG. 10(b), the taper portion is formed of multi-stage taper parts having a different tilt angle. The tilt angle of the multi-stage taper parts is configured to gradually decrease toward the center of the upper knife in the longitudinal direction. For example, as illustrated in FIG. 10(b), the upper knife 1 is formed as a taper unit where the blade of the lower end slants upwards toward the center of the upper knife in the longitudinal direction, and the taper unit includes a first taper part 1*b* of the side portion of the upper knife, and a second taper part 1*c* at the inner side of the first taper part 1*b*. Herein, the tilt angle of the first taper part 1*b* is greater than the tilt angle of the second taper part 1*c*. Through this configuration, it is possible to efficiently cut the electrode without pressing the upper knife deeply by reducing the depth of the blade portion of the lower end of the upper knife while making the shear angle of the first taper part 1*b* large. Namely, according to the present embodiment, it is possible to prevent the increase in the stroke of the upper knife holding unit 10 and prevent a damage to the electrode at the time of cutting the electrode. In FIG. 10(*b*), multi-stage taper unit includes two stage taper parts toward the center of the upper knife in the longitudinal direction, but it may also include three or more stage taper parts as necessary.

Although various embodiments of the present invention have been described, there may be various modified examples in order to make the electrode cutting more effective within the scope of the technical idea of the present invention.

For example, a stripper 115, which separates the electrode from the upper knife, may be installed on an electrode inflow route between the upper knife and the lower knife. As shown in FIGS. 7 and 8, if a stripper 115 is installed between the upper knife and the lower knife on the electrode inflow path, the upper knife 1 descends and cuts the electrode, and the ascending of the electrode in a state that the electrode has been stabbed by the upper knife is prevented by the stripper 115. The stripper 115 is coupled to the module frame 110.

In another modified example, the front surface block 11 of upper knife may be coupled to the front surface of the upper knife holding unit 10. Alternatively, an upper knife cover 12 may be installed on the upper end of the upper knife holding unit 10 (see FIG. 8). The front surface block 11 of the upper knife and the upper knife cover 12 protect the upper knife 1 and the upper knife holding unit 10 and prevent contamination. However, if the weight of the apparatus becomes excessively large due thereto, the front surface block 11 of the upper knife, or the upper knife cover 12 may be removed.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

1: upper knife
1*a*: taper portion
1*b*: first taper part
1*c*: second taper part
2: lower knife
10: upper knife holding unit
11: front surface block of upper knife
12: upper knife cover
20: shank unit
21: shank
22: shank shaft

40: cross roller guide
41: first guide rail
42: second guide rail
50: guide master
51: sleeve
52: a unit 52 having the post therein
100: all-in-one cutting cartridge module
110: module frame
111: upper frame
112: side portion
113: lower frame
114: guide
115: stripper
220: cradle
210: insertion passage
220: insertion guide
230: shank block
231: protrusion
232: insertion groove

The invention claimed is:

1. An apparatus for cutting an electrode, the apparatus comprising:
   a cutting cartridge module including an upper knife and a lower knife; and
   a cradle having a vertically extending side including an insertion guide configured to guide insertion of the cutting cartridge module, wherein the cutting cartridge module is coupled to the cradle,
   wherein, the cutting cartridge module includes a fixed module frame fixed on the cutting cartridge module and an upper knife holding unit which supports the upper knife and is configured to be slidable on the fixed module frame,
   wherein the lower knife is coupled to a lower portion of the fixed module frame, the lower knife positioned to face the upper knife, and
   wherein a shank unit is coupled to an upper portion of the upper knife holding unit, a movable shank block is coupled to an upper portion of the cradle, the shank unit is coupled to the shank block, and the upper knife holding unit is configured to be moved by movement of the shank block.

2. The apparatus of claim 1, wherein;
the cradle includes an insertion passage, and the cutting cartridge module is configured to be inserted into the cradle through the insertion passage.

3. The apparatus of claim 2, wherein;
a surface of the cutting cartridge module is coupled to a surface of the cradle by a coupling member.

4. The apparatus of claim 1, wherein;
the shank unit includes a shank and a shank shaft, and a passage hole, through which the shank and the shank shaft of the shank unit pass, is formed on an upper portion of the fixed module frame.

5. The apparatus of claim 1, wherein;
the upper knife holding unit is slidably supported on a side portion of the fixed module frame by a cross roller guide.

6. The apparatus of claim 5, wherein;
the cross roller guide includes a first guide rail coupled to the fixed module frame, and a second guide rail coupled to the upper knife holding unit.

7. The apparatus of claim 6, wherein;
two pairs of cross roller guides are installed between the upper knife holding unit and the fixed module frame, a first guide rail of each pair is positioned at an external side of the fixed module frame in a width direction, and a second guide rail of each pair is positioned at an internal side of the fixed module frame in the width direction.

8. The apparatus of claim 1, wherein;
the upper knife holding unit is slidably supported on the fixed module frame by a guide master.

9. The apparatus of claim 1, wherein;
the upper knife includes a taper portion in which a blade of the upper knife slants in a first direction toward a center of the upper knife in a horizontal direction.

10. The apparatus of claim 9, wherein;
the taper portion is formed of multi-stage taper parts having different tilt angles, and
  wherein the tilt angle of the multi-stage taper parts gradually decreases toward the center of the upper knife in the horizontal direction.

11. The apparatus of claim 1, wherein;
a stripper, which separates the electrode from the upper knife, is installed on an electrode inflow route between the upper knife and the lower knife.

12. The apparatus of claim 1, wherein;
a surface block of the upper knife is coupled to a surface of the upper knife holding unit.

13. The apparatus of claim 1, wherein:
the upper knife is configured to reciprocate vertically with respect to the lower knife.

* * * * *